(12) United States Patent
Allen-Bradley

(10) Patent No.: US 9,133,713 B2
(45) Date of Patent: Sep. 15, 2015

(54) GAS TURBINE ENGINE TURBINE BLADE AIRFOIL PROFILE

(75) Inventor: Eunice Allen-Bradley, Vernon, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 816 days.

(21) Appl. No.: 13/539,701

(22) Filed: Jul. 2, 2012

(65) Prior Publication Data

US 2014/0000280 A1    Jan. 2, 2014

(51) Int. Cl.
    *F01D 5/14*      (2006.01)

(52) U.S. Cl.
    CPC .......... *F01D 5/141* (2013.01); *F05D 2250/74* (2013.01); *Y02T 50/672* (2013.01); *Y02T 50/673* (2013.01)

(58) Field of Classification Search
    CPC .... F01D 14/14; F01D 14/141; F05D 2250/74
    USPC ..... 416/223 A, 243, DIG. 2, DIG. 5; 415/191
    See application file for complete search history.

(56) References Cited

U.S. PATENT DOCUMENTS

| | | | | |
|---|---|---|---|---|
| 7,537,433 | B2 * | 5/2009 | Girgis et al. | 416/223 A |
| 7,537,434 | B2 * | 5/2009 | Cheruku et al. | 416/223 R |
| 7,559,749 | B2 * | 7/2009 | Kidikian et al. | 416/223 A |
| 7,581,930 | B2 | 9/2009 | Aggarwala et al. | |
| 7,625,182 | B2 * | 12/2009 | Mah et al. | 416/223 A |
| 7,625,183 | B2 * | 12/2009 | Tsifourdaris et al. | 416/223 A |
| 7,632,075 | B2 * | 12/2009 | Liang et al. | 416/223 A |
| 7,648,340 | B2 * | 1/2010 | Sadler et al. | 416/223 A |
| 7,766,624 | B2 * | 8/2010 | Arinci et al. | 416/223 R |
| 7,976,280 | B2 * | 7/2011 | Brittingham et al. | 416/189 |
| 8,113,786 | B2 * | 2/2012 | Spracher et al. | 416/223 R |
| 2005/0111978 | A1 | 5/2005 | Strohl et al. | |
| 2008/0101959 | A1 | 5/2008 | McRae et al. | |
| 2008/0273984 | A1 | 11/2008 | Liang et al. | |
| 2009/0162204 | A1 | 6/2009 | Aggarwala et al. | |
| 2010/0329874 | A1 | 12/2010 | Tsifourdaris | |

OTHER PUBLICATIONS

International Search Report and Written Opinion for International Application No. PCT/US2013/044453 completed on Apr. 7, 2014.
International Preliminary Report on Patentability for PCT Application No. PCT/US2013/044453, mailed Jan. 15, 2015.

\* cited by examiner

*Primary Examiner* — Liam McDowell
*Assistant Examiner* — Maxime Adjagbe
(74) *Attorney, Agent, or Firm* — Carlson, Gaskey & Olds, P.C.

(57) ABSTRACT

A turbine blade for a gas turbine engine includes an airfoil that includes leading and trailing edges joined by spaced apart pressure and suction sides to provide an exterior airfoil surface extending from a platform in a radial direction to a tip. The external airfoil surface is formed in substantial conformance with multiple cross-sectional profiles of the airfoil described by a set of Cartesian coordinates set forth in Table 1. The Cartesian coordinates are provided by an axial coordinate scaled by a local axial chord. A circumferential coordinate is scaled by a local axial chord, and a span location. The local axial chord corresponds to a width of the airfoil between the leading and trailing edges at the span location.

11 Claims, 5 Drawing Sheets

GAS TURBINE ENGINE TURBINE BLADE AIRFOIL PROFILE

CROSS-REFERENCE TO RELATED APPLICATION

This application is related to co-pending application, entitled "GAS TURBINE ENGINE TURBINE BLADE AIRFOIL PROFILE" by United Technologies Corporation, application Ser. No. 13/539,715, filed Jul. 2, 2012.

BACKGROUND

This disclosure relates to a gas turbine engine, and more particularly to an airfoil that may be incorporated into a gas turbine engine.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections may include alternating series of rotating blades and stationary vanes that extend into the core flow path of the gas turbine engine. For example, in the turbine section, turbine blades rotate and extract energy from the hot combustion gases that are communicated along the core flow path of the gas turbine engine. The turbine vanes, which generally do not rotate, guide the airflow and prepare it for the next set of blades.

In turbine blade design, there is an emphasis on stress-resistant airfoil and platform designs, with reduced losses, increased lift and turning efficiency, and improved turbine performance and service life. To achieve these results, non-linear flow analyses and complex strain modeling are required, making practical results difficult to predict. Blade loading considerations also impose substantial design limitations, which cannot easily be generalized from one system to another.

SUMMARY

In one exemplary embodiment, a turbine blade for a gas turbine engine includes an airfoil that includes leading and trailing edges joined by spaced apart pressure and suction sides to provide an exterior airfoil surface extending from a platform in a radial direction to a tip. The external airfoil surface is formed in substantial conformance with multiple cross-sectional profiles of the airfoil described by a set of Cartesian coordinates set forth in Table 1. The Cartesian coordinates are provided by an axial coordinate scaled by a local axial chord. A circumferential coordinate is scaled by a local axial chord, and a span location. The local axial chord corresponds to a width of the airfoil between the leading and trailing edges at the span location.

In a further embodiment of any of the above, the airfoil is a second stage turbine blade.

In a further embodiment of any of the above, the span location corresponds to a distance from a rotational axis of the airfoil.

In a further embodiment of any of the above, the Cartesian coordinates in Table 1 have a tolerance relative to the specified coordinates of ±0.050 inches (±1.27 mm).

In another exemplary embodiment, a gas turbine engine includes a compressor section. A combustor is fluidly connected to the compressor section. A turbine section is fluidly connected to the combustor. The turbine section includes a high pressure turbine coupled to the high pressure compressor via a shaft. The turbine section includes a low pressure turbine. The high pressure turbine includes an array of turbine blades. At least one turbine blade includes an airfoil having leading and trailing edges joined by spaced apart pressure and suction sides to provide an exterior airfoil surface extending from a platform in a radial direction to a tip. The external airfoil surface is formed in substantial conformance with multiple cross-sectional profiles of the airfoil described by a set of Cartesian coordinates set forth in Table 1. The Cartesian coordinates are provided by an axial coordinate scaled by a local axial chord. A circumferential coordinate is scaled by a local axial chord, and a span location. The local axial chord corresponds to a width of the airfoil between the leading and trailing edges at the span location.

In a further embodiment of any of the above, the array is a second stage array of turbine blades.

In a further embodiment of any of the above, the high pressure turbine includes an array of fixed stator vanes upstream from the first stage array of turbine blades.

In a further embodiment of any of the above, the second stage array of turbine blades includes forty-four turbine blades.

In a further embodiment of any of the above, the span location corresponds to a distance from a rotational axis of the airfoil.

In a further embodiment of any of the above, the Cartesian coordinates in Table 1 have a tolerance relative to the specified coordinates of ±0.050 inches (±1.27 mm).

In a further embodiment of any of the above, the high pressure turbine consists of two arrays of turbine blades and two arrays of fixed stator vanes.

BRIEF DESCRIPTION OF THE DRAWINGS

The disclosure can be further understood by reference to the following detailed description when considered in connection with the accompanying drawings wherein.

DETAILED DESCRIPTION

Figure 1:
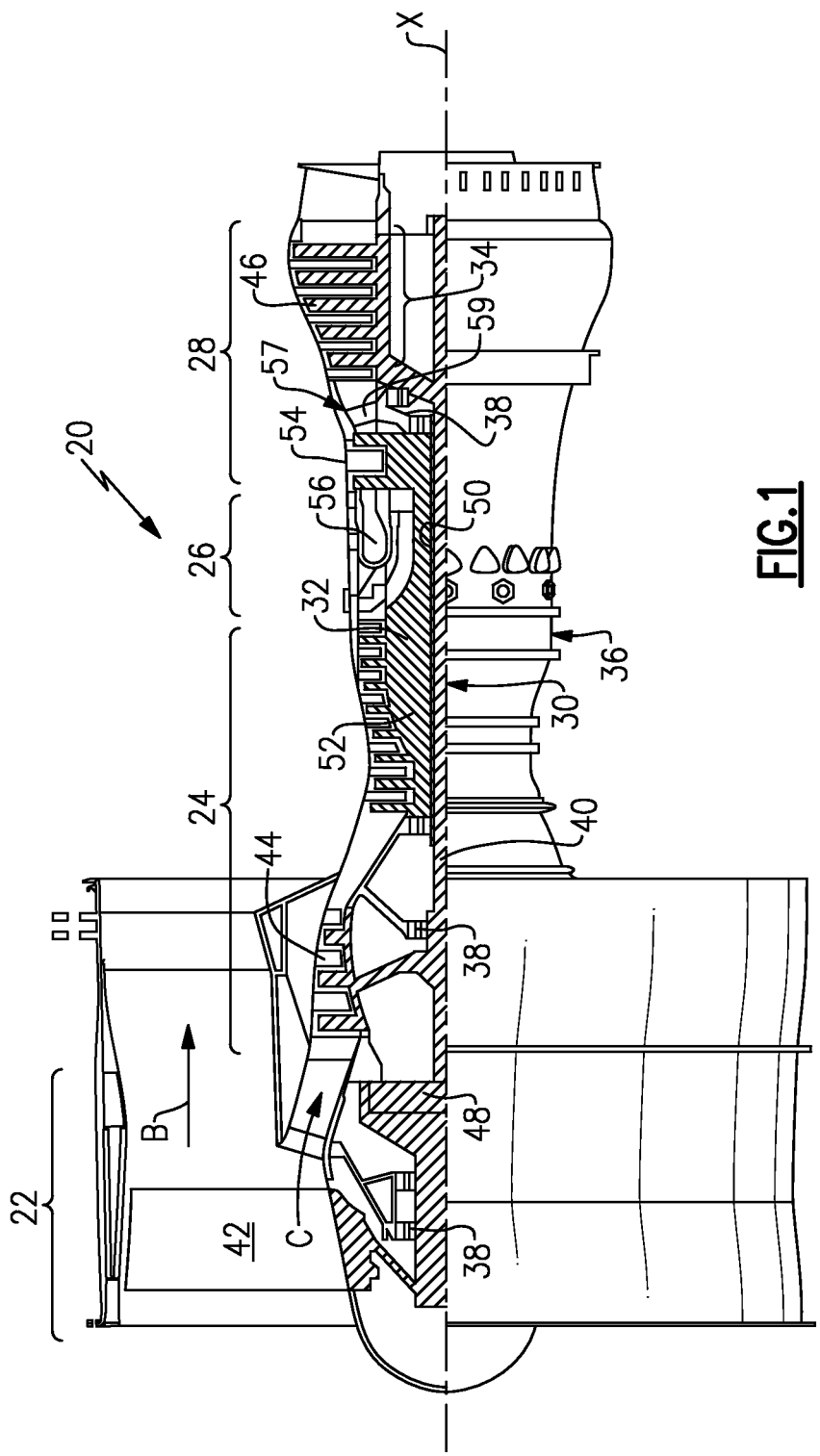
FIG. 1 schematically illustrates a gas turbine engine embodiment.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis X.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 57 of the engine static structure 36 is arranged generally between the high pressure turbine 54 and the low pressure turbine 46. The mid-turbine frame 57 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 57 includes vanes 59, which are in the core airflow path and function as an inlet guide vane for the low pressure turbine 46. Utilizing the vane 59 of the mid-turbine frame 57 as the inlet guide vane for low pressure turbine 46 decreases the length of the low pressure turbine 46 without increasing the axial length of the mid-turbine frame 57. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of [(Tram ° R)/518.7) 0.5]. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Figure 2:
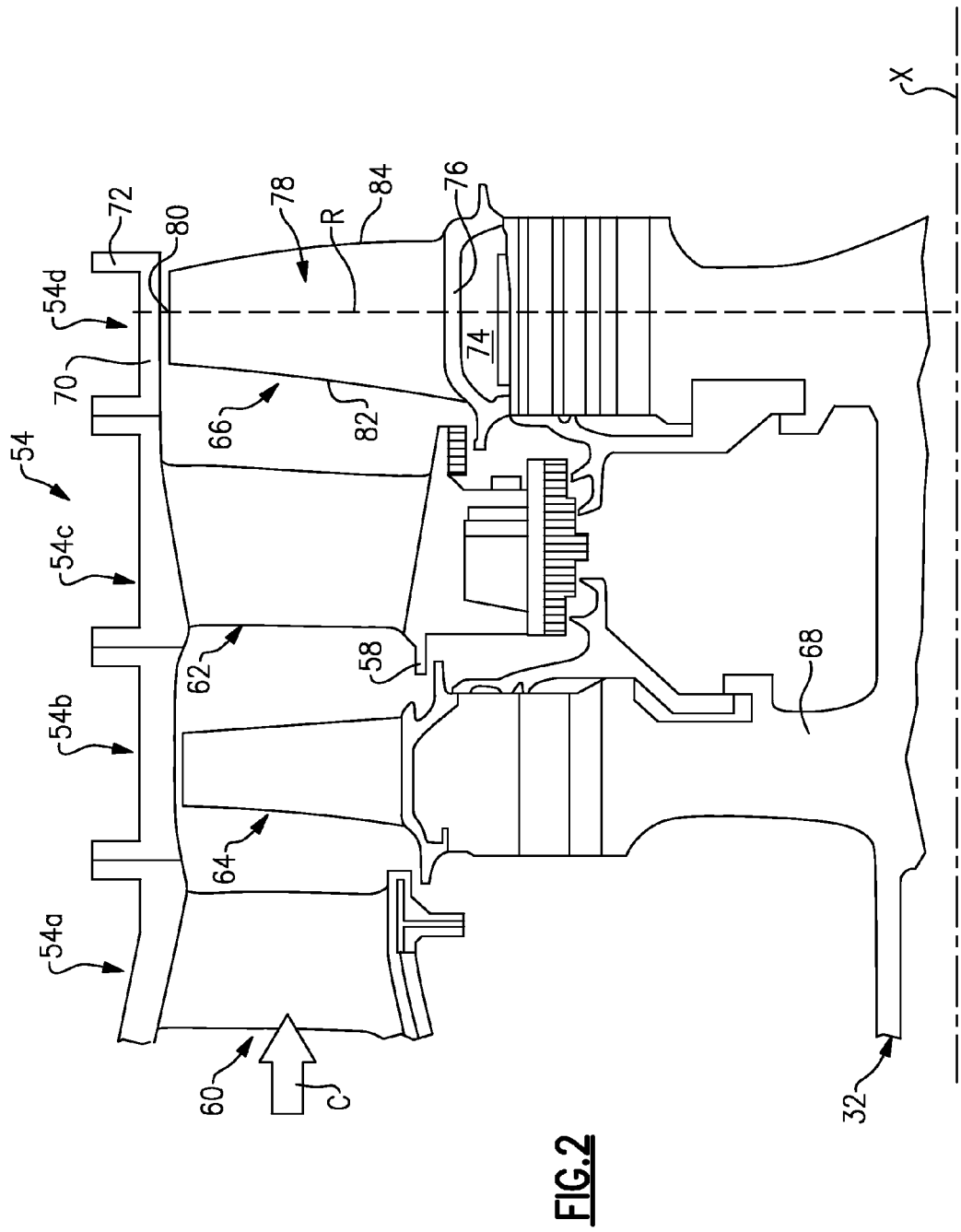
FIG. 2 is a cross-sectional view through a high pressure turbine section.

Referring to FIG. 2, a cross-sectional view through a high pressure turbine section 54 is illustrated. In the example high pressure turbine section 54, first and second arrays 54b, 54d of circumferentially spaced fixed vanes 60, 62 are axially spaced apart from one another. A first stage array 54a of circumferentially spaced turbine blades 64 is arranged axially between the first and second fixed vane arrays 54b, 54d. A second stage array 54c of circumferentially spaced turbine blades 66 is arranged aft of the second array 54b of fixed vanes 62. The first and second stage arrays 54a, 54c are arranged within a core flow path C and are operatively connected to a spool 32.

A root 74 of each turbine blade 66 is mounted to the rotor disk 68. The turbine blade 66 includes a platform 76, which provides the inner flow path, supported by the root 74. An airfoil 78 extending in a radial direction R from the platform 76 to a tip 80. It should be understood that the turbine blades may be integrally formed with the rotor such that the roots are eliminated. In such a configuration, the platform is provided by the outer diameter of the rotor. The airfoil 78 provides leading and trailing edges 82, 84. The tip 80 is arranged adjacent to a blade outer air seal 70 mounted to a turbine case 72. A platform 58 of the second fixed vane array 62 is arranged in an overlapping relationship with the turbine blades 64, 66.

Figure 3A:
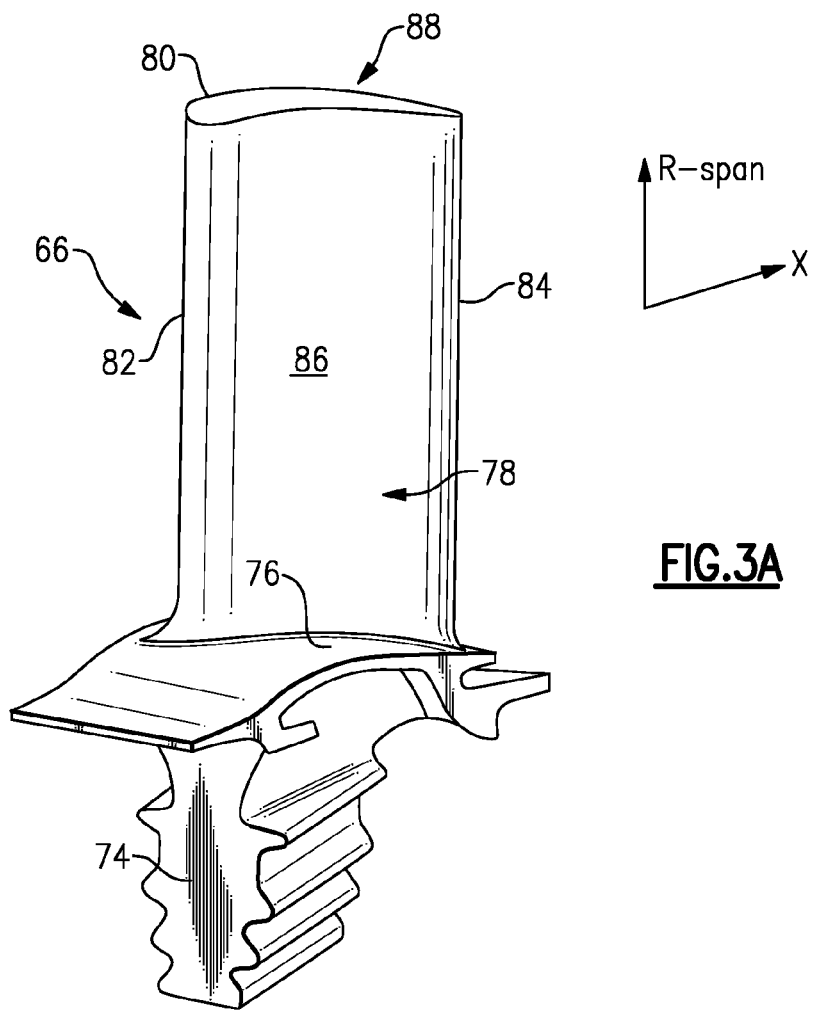
FIG. 3A is a perspective view of the airfoil having the disclosed cooling passage.
Figure 3B:
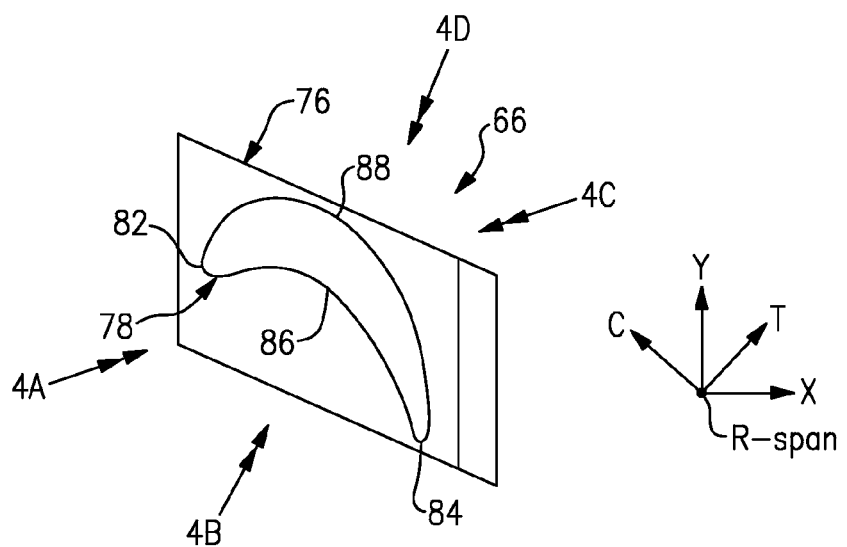
FIG. 3B is a plan view of the airfoil illustrating directional references.
Figure 4C:
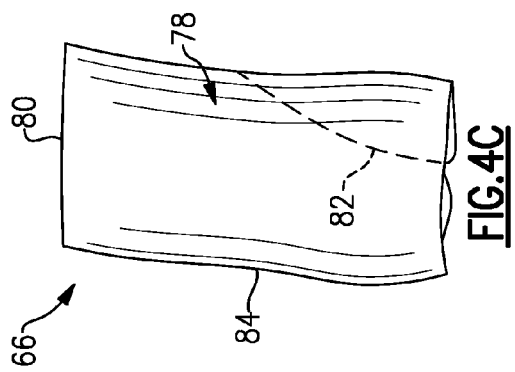
FIGS. 4A-4D illustrate different views of the airfoil from the directions indicated in FIG. 3B.
Figure 4B:
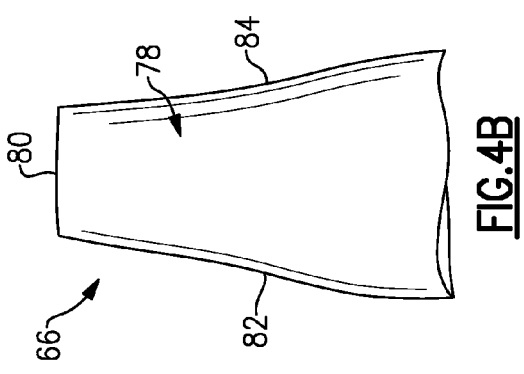
Figure 4D:
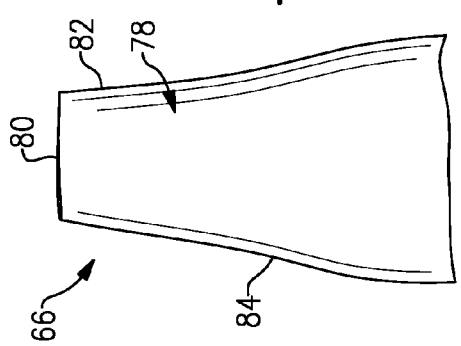
Figure 4A:
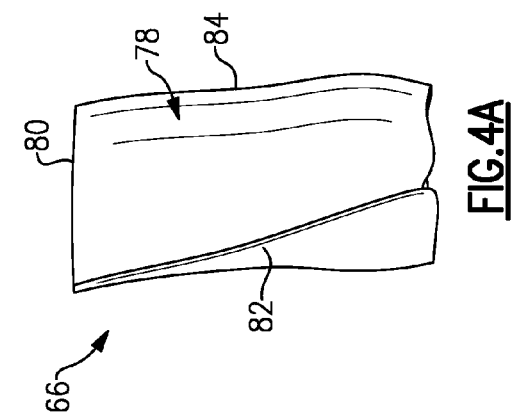

Referring to FIGS. 3A and 3B, the airfoil 78 somewhat schematically illustrates exterior airfoil surface extending in a chord-wise direction C from a leading edge 82 to a trailing edge 84. The airfoil 78 is provided between pressure (concave) and suction (convex) sides 86, 88 in an airfoil thickness direction T, which is generally perpendicular to the chord-wise direction C. Multiple turbine blades 66 are arranged circumferentially in a circumferential direction Y. The airfoil 78 extends from the platform 76 in the radial direction R, or spanwise, to the tip 80. The exterior airfoil surface may include multiple film cooling holes (not shown).

The exterior surface of the airfoil 78 generates lift based upon its geometry and direct flow along the core flow path C. Various views of the airfoil 78 of the turbine blade 66 are shown in FIGS. 4A-4D. In one example, the second stage array 54d consists of forty-four of turbine blades 66, but the number may vary according to engine size. The turbine blades 66 are constructed from a high strength, heat resistant material such as a nickel-based or cobalt-based superalloy, or of a high temperature, stress resistant ceramic or composite material. In cooled configurations, internal fluid passages and external cooling apertures provide for a combination of impingement and film cooling. In addition, one or more thermal barrier coatings, abrasion-resistant coatings or other protective coatings may be applied to the turbine blade 66.

Figure 5:
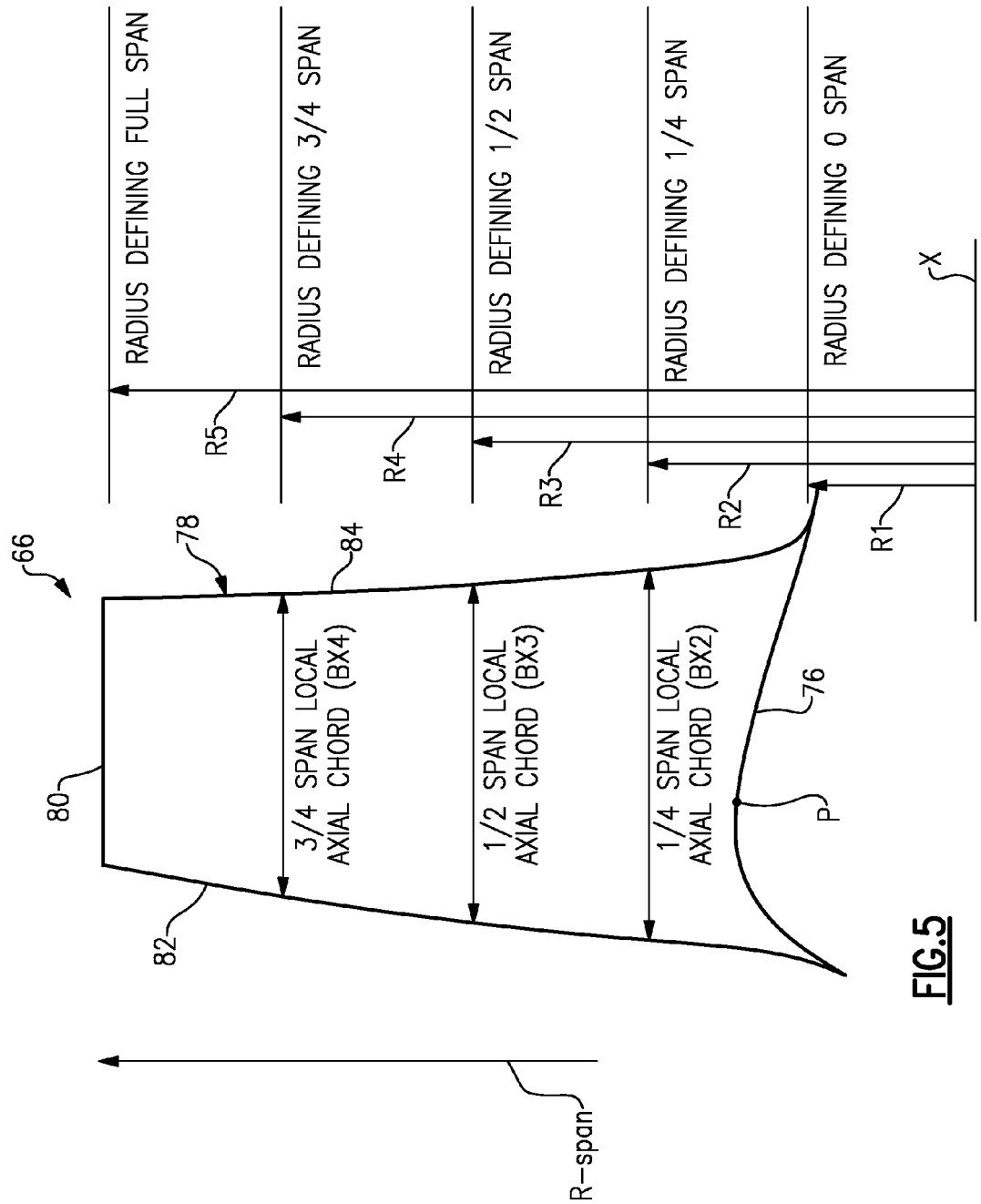
FIG. 5 depict the span positions and local axial chords referenced in Table 1.

The geometries of airfoil 78 are described in terms of Cartesian coordinates defined along x, y and z axes, which respectively correspond to the axial (x), circumferential (y) and radial (span) directions shown in FIGS. 3A and 3B. The span coordinate is provided as a radial distance (R1-R5 in FIG. 5) from the rotational axis X of the airfoil 78. The "0" span is taken at a point P where the airfoil meets the platform 76, as schematically illustrated in FIG. 5. The overall span is the distance from the point P to the tip 80 in the radial direction R, which corresponds to R5. By way of example, the "¼ span" is 25% the distance from the point P toward the tip 80 in the radial direction R. In one example, R1 is 7.6270 inch (19.373 cm), R2 is 8.1465 inch (20.692 cm), R3 is 8.6661 inch (22.012 cm), R4 is 9.1856 inch (23.331 cm), and R5 is 9.7052 inch (24.651 cm). In the example, the overall span of the airfoil 78 relative to point P is 2.0782 inch (5.279 cm).

The axial (x) and circumferential (y) coordinates are normalized by the local axial chord (Bx) for the given span location (Bx1-Bx5), as shown in FIG. 5. By way of example, local axial chord (Bx2) for axial (x) and circumferential (y) coordinates associated with the ¼ span corresponds to the width of the airfoil 78 between the leading and trailing edges 82, 84 at the ¼ span location.

The contour of the airfoil 78 is set forth in Table 1, which provides the axial (x), circumferential (y) coordinates (in inches) and span coordinates. The axial and circumferential coordinates can be converted to metric (mm) by multiplying by 25.4. Three dimensional airfoil surfaces are formed by joining adjacent points in Table 1 in a smooth manner and joining adjacent sections or sectional profiles along the span. The manufacturing tolerance relative to the specified coordinates is ±±0.050 inches (±1.27 mm). The coordinates define points on a cold, uncoated, stationary airfoil surface, in a plane at 0% span. Additional elements such as cooling holes, protective coatings, fillets and seal structures may also be formed onto the specified airfoil surface, or onto an adjacent platform surface, but these elements are not necessarily described by the normalized coordinates. For example, a variable coating may be applied between 0.0001 inch (0.003 mm) (trace) and 0.010 inch (0.25 mm) thick.

TABLE 1

REFERENCE RADIUS: R1
SECTION COORDINATES (X, Y)/BX1

| | |
|---|---|
| 0.0082 | −0.0266 |
| 0.0073 | −0.0253 |
| 0.0065 | −0.0239 |
| 0.0050 | −0.0212 |
| 0.0037 | −0.0183 |
| 0.0022 | −0.0139 |
| 0.0008 | −0.0077 |
| 0.0000 | 0.0000 |
| 0.0006 | 0.0110 |
| 0.0034 | 0.0248 |
| 0.0088 | 0.0410 |
| 0.0160 | 0.0606 |
| 0.0250 | 0.0824 |
| 0.0362 | 0.1063 |
| 0.0507 | 0.1331 |
| 0.0687 | 0.1613 |
| 0.0905 | 0.1893 |
| 0.1181 | 0.2174 |
| 0.1507 | 0.2420 |
| 0.1898 | 0.2621 |
| 0.2336 | 0.2746 |
| 0.2790 | 0.2785 |
| 0.3259 | 0.2744 |
| 0.3718 | 0.2633 |
| 0.4160 | 0.2468 |
| 0.4584 | 0.2261 |
| 0.4991 | 0.2022 |
| 0.5381 | 0.1756 |
| 0.5756 | 0.1470 |
| 0.6118 | 0.1166 |
| 0.6467 | 0.0849 |
| 0.6804 | 0.0519 |
| 0.7130 | 0.0178 |
| 0.7444 | −0.0175 |
| 0.7742 | −0.0542 |
| 0.8020 | −0.0923 |
| 0.8272 | −0.1303 |
| 0.8506 | −0.1695 |
| 0.8719 | −0.2081 |
| 0.8906 | −0.2444 |
| 0.9079 | −0.2798 |
| 0.9230 | −0.3121 |
| 0.9371 | −0.3432 |
| 0.9490 | −0.3701 |
| 0.9595 | −0.3944 |
| 0.9688 | −0.4162 |
| 0.9766 | −0.4347 |
| 0.9838 | −0.4517 |
| 0.9887 | −0.4633 |
| 0.9931 | −0.4738 |
| 0.9964 | −0.4815 |
| 0.9988 | −0.4872 |
| 1.0000 | −0.4918 |
| 0.9996 | −0.4949 |
| 0.9983 | −0.4978 |
| 0.9974 | −0.4991 |
| 0.9964 | −0.5002 |
| 0.9954 | −0.5008 |
| 0.9943 | −0.5012 |
| 0.9922 | −0.5019 |
| 0.9899 | −0.5021 |
| 0.9866 | −0.5016 |
| 0.9826 | −0.4995 |
| 0.9788 | −0.4954 |
| 0.9738 | −0.4893 |
| 0.9672 | −0.4815 |
| 0.9591 | −0.4722 |
| 0.9493 | −0.4613 |
| 0.9377 | −0.4489 |

TABLE 1-continued

| | |
|---|---|
| 0.9244 | −0.4352 |
| 0.9091 | −0.4202 |
| 0.8922 | −0.4035 |
| 0.8733 | −0.3858 |
| 0.8523 | −0.3670 |
| 0.8300 | −0.3481 |
| 0.8054 | −0.3283 |
| 0.7792 | −0.3088 |
| 0.7523 | −0.2902 |
| 0.7239 | −0.2717 |
| 0.6952 | −0.2539 |
| 0.6660 | −0.2368 |
| 0.6365 | −0.2204 |
| 0.6066 | −0.2045 |
| 0.5764 | −0.1894 |
| 0.5458 | −0.1749 |
| 0.5150 | −0.1610 |
| 0.4838 | −0.1478 |
| 0.4524 | −0.1353 |
| 0.4207 | −0.1235 |
| 0.3888 | −0.1124 |
| 0.3566 | −0.1020 |
| 0.3242 | −0.0923 |
| 0.2927 | −0.0838 |
| 0.2609 | −0.0760 |
| 0.2301 | −0.0693 |
| 0.2013 | −0.0638 |
| 0.1735 | −0.0592 |
| 0.1478 | −0.0556 |
| 0.1243 | −0.0529 |
| 0.1030 | −0.0510 |
| 0.0839 | −0.0497 |
| 0.0670 | −0.0490 |
| 0.0523 | −0.0483 |
| 0.0401 | −0.0463 |
| 0.0304 | −0.0433 |
| 0.0233 | −0.0399 |
| 0.0185 | −0.0369 |
| 0.0150 | −0.0341 |
| 0.0125 | −0.0318 |
| 0.0110 | −0.0301 |
| 0.0096 | −0.0284 |
| 0.0089 | −0.0275 |

REFERENCE RADIUS: R2
SECTION COORDINATES (X, Y)/BX2

| | |
|---|---|
| 0.0008 | −0.0098 |
| 0.0005 | −0.0082 |
| 0.0003 | −0.0065 |
| 0.0000 | −0.0033 |
| 0.0000 | 0.0000 |
| 0.0004 | 0.0048 |
| 0.0018 | 0.0112 |
| 0.0045 | 0.0189 |
| 0.0097 | 0.0285 |
| 0.0180 | 0.0405 |
| 0.0293 | 0.0556 |
| 0.0420 | 0.0716 |
| 0.0576 | 0.0900 |
| 0.0767 | 0.1108 |
| 0.0988 | 0.1326 |
| 0.1243 | 0.1549 |
| 0.1552 | 0.1777 |
| 0.1892 | 0.1975 |
| 0.2282 | 0.2140 |
| 0.2730 | 0.2248 |
| 0.3201 | 0.2273 |
| 0.3669 | 0.2212 |
| 0.4136 | 0.2068 |
| 0.4576 | 0.1859 |
| 0.4990 | 0.1600 |
| 0.5377 | 0.1302 |
| 0.5740 | 0.0975 |
| 0.6081 | 0.0626 |
| 0.6403 | 0.0259 |
| 0.6708 | −0.0123 |
| 0.6995 | −0.0519 |
| 0.7264 | −0.0927 |
| 0.7514 | −0.1346 |
| 0.7750 | −0.1773 |
| 0.7974 | −0.2208 |
| 0.8188 | −0.2647 |
| 0.8386 | −0.3075 |
| 0.8580 | −0.3506 |
| 0.8764 | −0.3924 |
| 0.8932 | −0.4312 |
| 0.9093 | −0.4685 |
| 0.9243 | −0.5036 |
| 0.9374 | −0.5346 |
| 0.9489 | −0.5625 |
| 0.9597 | −0.5889 |
| 0.9690 | −0.6120 |
| 0.9772 | −0.6320 |
| 0.9841 | −0.6489 |
| 0.9895 | −0.6620 |
| 0.9930 | −0.6707 |
| 0.9965 | −0.6792 |
| 0.9990 | −0.6853 |
| 1.0000 | −0.6900 |
| 0.9994 | −0.6931 |
| 0.9979 | −0.6961 |
| 0.9969 | −0.6974 |
| 0.9958 | −0.6985 |
| 0.9947 | −0.6991 |
| 0.9936 | −0.6995 |
| 0.9912 | −0.7002 |
| 0.9888 | −0.7003 |
| 0.9851 | −0.6997 |
| 0.9808 | −0.6973 |
| 0.9767 | −0.6927 |
| 0.9715 | −0.6858 |
| 0.9645 | −0.6768 |
| 0.9562 | −0.6663 |
| 0.9462 | −0.6539 |
| 0.9345 | −0.6395 |
| 0.9213 | −0.6236 |
| 0.9061 | −0.6056 |
| 0.8890 | −0.5855 |
| 0.8706 | −0.5643 |
| 0.8501 | −0.5413 |
| 0.8282 | −0.5179 |
| 0.8042 | −0.4931 |
| 0.7785 | −0.4682 |
| 0.7518 | −0.4443 |
| 0.7237 | −0.4203 |
| 0.6950 | −0.3970 |
| 0.6656 | −0.3744 |
| 0.6357 | −0.3526 |
| 0.6053 | −0.3316 |
| 0.5743 | −0.3114 |
| 0.5427 | −0.2920 |
| 0.5108 | −0.2734 |
| 0.4783 | −0.2556 |
| 0.4455 | −0.2385 |
| 0.4122 | −0.2223 |
| 0.3786 | −0.2067 |
| 0.3449 | −0.1917 |
| 0.3108 | −0.1771 |
| 0.2779 | −0.1631 |
| 0.2449 | −0.1492 |
| 0.2136 | −0.1358 |
| 0.1837 | −0.1228 |
| 0.1557 | −0.1101 |
| 0.1300 | −0.0981 |
| 0.1067 | −0.0866 |
| 0.0861 | −0.0762 |
| 0.0671 | −0.0660 |
| 0.0512 | −0.0573 |
| 0.0372 | −0.0493 |
| 0.0252 | −0.0420 |
| 0.0167 | −0.0356 |
| 0.0107 | −0.0295 |
| 0.0070 | −0.0245 |
| 0.0045 | −0.0202 |
| 0.0030 | −0.0168 |
| 0.0021 | −0.0146 |
| 0.0014 | −0.0122 |
| 0.0011 | −0.0110 |

TABLE 1-continued

REFERENCE RADIUS: R3
SECTION COORDINATES (X, Y)/BX3

| | |
|---|---|
| 0.0001 | −0.0033 |
| 0.0000 | −0.0017 |
| 0.0000 | 0.0000 |
| 0.0002 | 0.0033 |
| 0.0006 | 0.0065 |
| 0.0018 | 0.0112 |
| 0.0041 | 0.0173 |
| 0.0080 | 0.0243 |
| 0.0149 | 0.0336 |
| 0.0245 | 0.0447 |
| 0.0376 | 0.0575 |
| 0.0542 | 0.0706 |
| 0.0747 | 0.0831 |
| 0.1008 | 0.0941 |
| 0.1295 | 0.1012 |
| 0.1637 | 0.1039 |
| 0.2012 | 0.1008 |
| 0.2411 | 0.0916 |
| 0.2809 | 0.0767 |
| 0.3216 | 0.0562 |
| 0.3616 | 0.0311 |
| 0.3996 | 0.0031 |
| 0.4370 | −0.0286 |
| 0.4723 | −0.0623 |
| 0.5058 | −0.0979 |
| 0.5374 | −0.1352 |
| 0.5674 | −0.1737 |
| 0.5963 | −0.2132 |
| 0.6244 | −0.2532 |
| 0.6518 | −0.2936 |
| 0.6786 | −0.3345 |
| 0.7047 | −0.3758 |
| 0.7300 | −0.4177 |
| 0.7545 | −0.4600 |
| 0.7784 | −0.5026 |
| 0.8018 | −0.5456 |
| 0.8240 | −0.5873 |
| 0.8459 | −0.6291 |
| 0.8666 | −0.6698 |
| 0.8857 | −0.7079 |
| 0.9034 | −0.7442 |
| 0.9198 | −0.7787 |
| 0.9344 | −0.8097 |
| 0.9468 | −0.8366 |
| 0.9586 | −0.8624 |
| 0.9684 | −0.8842 |
| 0.9772 | −0.9041 |
| 0.9843 | −0.9202 |
| 0.9901 | −0.9336 |
| 0.9948 | −0.9444 |
| 0.9979 | −0.9518 |
| 0.9998 | −0.9581 |
| 1.0000 | −0.9630 |
| 0.9991 | −0.9661 |
| 0.9976 | −0.9690 |
| 0.9967 | −0.9703 |
| 0.9956 | −0.9715 |
| 0.9944 | −0.9722 |
| 0.9931 | −0.9727 |
| 0.9904 | −0.9734 |
| 0.9876 | −0.9737 |
| 0.9834 | −0.9732 |
| 0.9783 | −0.9710 |
| 0.9732 | −0.9662 |
| 0.9674 | −0.9583 |
| 0.9601 | −0.9483 |
| 0.9508 | −0.9359 |
| 0.9397 | −0.9214 |
| 0.9268 | −0.9047 |
| 0.9121 | −0.8861 |
| 0.8958 | −0.8654 |
| 0.8774 | −0.8421 |
| 0.8569 | −0.8166 |
| 0.8350 | −0.7898 |
| 0.8117 | −0.7620 |
| 0.7860 | −0.7323 |
| 0.7588 | −0.7022 |
| 0.7307 | −0.6729 |
| 0.7012 | −0.6430 |
| 0.6714 | −0.6134 |
| 0.6413 | −0.5841 |
| 0.6109 | −0.5551 |
| 0.5802 | −0.5265 |
| 0.5492 | −0.4981 |
| 0.5180 | −0.4700 |
| 0.4865 | −0.4421 |
| 0.4549 | −0.4145 |
| 0.4232 | −0.3870 |
| 0.3913 | −0.3596 |
| 0.3593 | −0.3324 |
| 0.3273 | −0.3053 |
| 0.2952 | −0.2780 |
| 0.2643 | −0.2518 |
| 0.2333 | −0.2255 |
| 0.2037 | −0.2002 |
| 0.1759 | −0.1762 |
| 0.1498 | −0.1536 |
| 0.1249 | −0.1317 |
| 0.1033 | −0.1126 |
| 0.0837 | −0.0951 |
| 0.0657 | −0.0789 |
| 0.0500 | −0.0646 |
| 0.0365 | −0.0523 |
| 0.0250 | −0.0417 |
| 0.0162 | −0.0335 |
| 0.0097 | −0.0263 |
| 0.0057 | −0.0205 |
| 0.0031 | −0.0154 |
| 0.0017 | −0.0115 |
| 0.0010 | −0.0089 |
| 0.0004 | −0.0061 |
| 0.0002 | −0.0047 |

REFERENCE RADIUS: R4
SECTION COORDINATES (X, Y)/BX4

| | |
|---|---|
| 0.00004 | −0.00165 |
| 0.00000 | 0.00000 |
| 0.00010 | 0.00188 |
| 0.00057 | 0.00540 |
| 0.00142 | 0.00872 |
| 0.00330 | 0.01356 |
| 0.00674 | 0.01976 |
| 0.01209 | 0.02684 |
| 0.02086 | 0.03517 |
| 0.03424 | 0.04328 |
| 0.05265 | 0.04931 |
| 0.07566 | 0.05181 |
| 0.10182 | 0.04999 |
| 0.13028 | 0.04363 |
| 0.16209 | 0.03187 |
| 0.19523 | 0.01496 |
| 0.22861 | −0.00630 |
| 0.26350 | −0.03288 |
| 0.29743 | −0.06318 |
| 0.33112 | −0.09881 |
| 0.36245 | −0.13882 |
| 0.39121 | −0.18073 |
| 0.42015 | −0.22475 |
| 0.44850 | −0.26894 |
| 0.47664 | −0.31336 |
| 0.50467 | −0.35786 |
| 0.53274 | −0.40233 |
| 0.56104 | −0.44666 |
| 0.58966 | −0.49078 |
| 0.61875 | −0.53459 |
| 0.64793 | −0.57834 |
| 0.67632 | −0.62260 |
| 0.70313 | −0.66784 |
| 0.72838 | −0.71398 |
| 0.75271 | −0.76058 |
| 0.77675 | −0.80726 |
| 0.80015 | −0.85250 |
| 0.82360 | −0.89760 |
| 0.84641 | −0.94106 |
| 0.86779 | −0.98131 |
| 0.88880 | −1.02040 |
| 0.90758 | −1.05536 |

TABLE 1-continued

| | |
|---|---|
| 0.92456 | −1.08725 |
| 0.94008 | −1.11707 |
| 0.95381 | −1.14412 |
| 0.96516 | −1.16696 |
| 0.97585 | −1.18883 |
| 0.98383 | −1.20538 |
| 0.99061 | −1.21974 |
| 0.99564 | −1.23076 |
| 0.99871 | −1.23908 |
| 1.00000 | −1.24597 |
| 1.00000 | −1.25120 |
| 0.99890 | −1.25453 |
| 0.99721 | −1.25766 |
| 0.99620 | −1.25904 |
| 0.99505 | −1.26034 |
| 0.99364 | −1.26108 |
| 0.99217 | −1.26168 |
| 0.98895 | −1.26250 |
| 0.98579 | −1.26282 |
| 0.98098 | −1.26236 |
| 0.97499 | −1.25993 |
| 0.96906 | −1.25467 |
| 0.96221 | −1.24539 |
| 0.95410 | −1.23356 |
| 0.94422 | −1.21928 |
| 0.93183 | −1.20183 |
| 0.91804 | −1.18259 |
| 0.90142 | −1.15944 |
| 0.88436 | −1.13545 |
| 0.86435 | −1.10722 |
| 0.84280 | −1.07674 |
| 0.81942 | −1.04382 |
| 0.79498 | −1.00979 |
| 0.76841 | −0.97324 |
| 0.74028 | −0.93580 |
| 0.71128 | −0.89895 |
| 0.68118 | −0.86105 |
| 0.65086 | −0.82327 |
| 0.62038 | −0.78562 |
| 0.58975 | −0.74807 |
| 0.55900 | −0.71065 |
| 0.52813 | −0.67330 |
| 0.49720 | −0.63602 |
| 0.46619 | −0.59879 |
| 0.43516 | −0.56161 |
| 0.40410 | −0.52440 |
| 0.37306 | −0.48720 |
| 0.34205 | −0.44998 |
| 0.31116 | −0.41277 |
| 0.28023 | −0.37536 |
| 0.25051 | −0.33917 |
| 0.22096 | −0.30284 |
| 0.19263 | −0.26763 |
| 0.16634 | −0.23450 |
| 0.14149 | −0.20272 |
| 0.11872 | −0.17317 |
| 0.09803 | −0.14592 |
| 0.08028 | −0.12216 |
| 0.06383 | −0.09986 |
| 0.04957 | −0.08024 |
| 0.03741 | −0.06332 |
| 0.02663 | −0.04816 |
| 0.01858 | −0.03677 |
| 0.01206 | −0.02749 |
| 0.00744 | −0.02087 |
| 0.00404 | −0.01547 |
| 0.00203 | −0.01110 |
| 0.00104 | −0.00811 |
| 0.00036 | −0.00488 |
| 0.00016 | −0.00328 |

In general, the turbine blade airfoil 78, as described herein, has a combination of axial sweep and tangential lean. Depending on configuration, the lean and sweep angles sometimes vary by up to ±10° or more. In addition, the turbine blade 78 is sometimes rotated with respect to a radial axis or a normal to the platform or shroud surface, for example by up to ±10° or more.

Novel aspects of the turbine blade and associated airfoil surfaces described herein are achieved by substantial conformance to specified geometries. Substantial conformance generally includes or may include a manufacturing tolerance of about ±0.050 inches (±1.27 mm), in order to account for variations in molding, cutting, shaping, surface finishing and other manufacturing processes, and to accommodate variability in coating thicknesses. This tolerance is generally constant or not scalable, and applies to each of the specified blade surfaces, regardless of size.

Substantial conformance is based on sets of points representing a three-dimensional surface with particular physical dimensions, for example in inches or millimeters, as determined by selecting particular values of the scaling parameters. A substantially conforming airfoil, blade or vane structure has surfaces that conform to the specified sets of points, within the specified tolerance.

Alternatively, substantial conformance is based on a determination by a national or international regulatory body, for example in a part certification or part manufacture approval (PMA) process for the Federal Aviation Administration, the European Aviation Safety Agency, the Civil Aviation Administration of China, the Japan Civil Aviation Bureau, or the Russian Federal Agency for Air Transport. In these configurations, substantial conformance encompasses a determination that a particular part or structure is identical to, or sufficiently similar to, the specified airfoil, blade or vane, or that the part or structure is sufficiently the same with respect to a part design in a type-certified or type-certificated airfoil, blade or vane, such that the part or structure complies with airworthiness standards applicable to the specified blade, vane or airfoil. In particular, substantial conformance encompasses any regulatory determination that a particular part or structure is sufficiently similar to, identical to, or the same as a specified blade, vane or airfoil, such that certification or authorization for use is based at least in part on the determination of similarity.

Although an example embodiment has been disclosed, a worker of ordinary skill in this art would recognize that certain modifications would come within the scope of the claims. For that reason, the following claims should be studied to determine their true scope and content.

What is claimed is:

1. A turbine blade for a gas turbine engine comprising:
    an airfoil including leading and trailing edges joined by spaced apart pressure and suction sides to provide an exterior airfoil surface extending from a platform in a radial direction to a tip; and
    wherein the external airfoil surface is formed in substantial conformance with multiple cross-sectional profiles of the airfoil described by a set of Cartesian coordinates set forth in Table 1, the Cartesian coordinates provided by an axial coordinate scaled by a local axial chord, a circumferential coordinate scaled by a local axial chord, and a span location, wherein the local axial chord corresponds to a width of the airfoil between the leading and trailing edges at the span location.

2. The turbine blade according to claim 1, wherein the airfoil is a second stage turbine blade.

3. The turbine blade according to claim 1, wherein the span location corresponds to a distance from a rotational axis of the airfoil.

4. The turbine blade according to claim 1, wherein the Cartesian coordinates in Table 1 have a tolerance relative to the specified coordinates of ±0.050 inches (±1.27 mm).

5. A gas turbine engine comprising:
a compressor section;
a combustor fluidly connected to the compressor section;
a turbine section fluidly connected to the combustor, the turbine section comprising:
  a high pressure turbine coupled to the high pressure compressor via a shaft;
  a low pressure turbine; and
wherein the high pressure turbine includes an array of turbine blades, wherein at least one turbine blade includes an airfoil having leading and trailing edges joined by spaced apart pressure and suction sides to provide an exterior airfoil surface extending from a platform in a radial direction to a tip; and
wherein the external airfoil surface is formed in substantial conformance with multiple cross-sectional profiles of the airfoil described by a set of Cartesian coordinates set forth in Table 1, the Cartesian coordinates provided by an axial coordinate scaled by a local axial chord, a circumferential coordinate scaled by a local axial chord, and a span location, wherein the local axial chord corresponds to a width of the airfoil between the leading and trailing edges at the span location.

6. The gas turbine engine according to claim 5, wherein the array is a second stage array of turbine blades.

7. The gas turbine engine according to claim 6, wherein the high pressure turbine includes an array of fixed stator vanes upstream from the first stage array of turbine blades.

8. The gas turbine engine according to claim 6, wherein the second stage array of turbine blades includes forty-four turbine blades.

9. The gas turbine engine according to claim 5, wherein the span location corresponds to a distance from a rotational axis of the airfoil.

10. The gas turbine engine according to claim 5, wherein the Cartesian coordinates in Table 1 have a tolerance relative to the specified coordinates of ±0.050 inches (±1.27 mm).

11. The gas turbine engine according to claim 5, wherein the high pressure turbine consists of two arrays of turbine blades and two arrays of fixed stator vanes.

* * * * *